(12) United States Patent
Scheel et al.

(10) Patent No.: US 7,534,962 B2
(45) Date of Patent: *May 19, 2009

(54) NON-HALOGENATED HEAVY METAL FREE VEHICULAR CABLE INSULATION AND HARNESS COVERING MATERIAL

(75) Inventors: Mark A. Scheel, Canfield, OH (US); Edward L. Monroe, Cortland, OH (US); Raman V. Chiruvella, Decatur, GA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/483,788

(22) Filed: Jul. 10, 2006

(65) Prior Publication Data

US 2009/0014201 A9    Jan. 15, 2009

Related U.S. Application Data

(63) Continuation-in-part of application No. 11/473,648, filed on Jun. 23, 2006, now Pat. No. 7,408,116.

(51) Int. Cl.
*H01B 7/295* (2006.01)
(52) U.S. Cl. .............................. 174/110 R; 174/113 R
(58) Field of Classification Search ............. 174/110 R, 174/113 R, 110 PM
See application file for complete search history.

(56) References Cited

U.S. PATENT DOCUMENTS

| 3,257,357 A | 6/1966 | Stamatoff |
|---|---|---|
| 3,257,358 A | 6/1966 | Stamatoff |
| 3,306,874 A | 2/1967 | Hay |
| 3,306,875 A | 2/1967 | Hay |
| 3,383,435 A * | 5/1968 | Cizek ......................... 525/132 |
| 3,676,202 A * | 7/1972 | Korpman .............. 428/355 BL |
| 4,132,684 A | 1/1979 | Izawa et al. |
| 4,510,348 A * | 4/1985 | Arroyo et al. ........... 174/121 A |
| 4,797,453 A | 1/1989 | Taubitz et al. |
| 5,475,041 A | 12/1995 | Weil et al. |
| 5,521,009 A | 5/1996 | Ishikawa et al. |
| 6,140,623 A | 10/2000 | Boehnlein et al. |
| 6,322,882 B1 * | 11/2001 | Moritomi ..................... 428/220 |
| 6,331,336 B1 * | 12/2001 | Szonn et al. ............... 428/40.1 |
| 6,359,230 B1 | 3/2002 | Hildreth |

(Continued)

OTHER PUBLICATIONS

Phelps Dodge High Performance Conductors, HPC Copper Alloy, Aug. 15, 2005, 4 pages, Inman, SC (U.S.A.).

(Continued)

*Primary Examiner*—Chau N Nguyen
(74) *Attorney, Agent, or Firm*—Thomas W. Twomey

(57) ABSTRACT

Described is a vehicular harness comprising a plurality of insulated non-halogenated, heavy metal free vehicular cables, each comprising an inner core of a copper based metal wire having a thickness area of at least about 0.1 mm, an outer insulation, covering the length of the inner core, comprised of a thermoplastic polyphenylene ether composition that has no halogen or heavy metal added thereto, the insulated cable capable of meeting the testing standard ISO 6722, and a tape comprised of the thermoplastic polyphenylene ether composition wrapped around the plurality of cables to hold the cables together. Also described is a tape having a plastic PPE layer with an adhesive on the bottom and a pealable layer.

3 Claims, 2 Drawing Sheets

U.S. PATENT DOCUMENTS

| | | |
|---|---|---|
| 6,849,016 B2 | 2/2005 | Ashtiani et al. |
| 6,894,227 B2 | 5/2005 | Kanamori et al. |
| 6,998,443 B2 | 2/2006 | Lee et al. |
| 7,008,270 B1 | 3/2006 | Huh et al. |
| 7,084,347 B2 | 8/2006 | Mhetar et al. |
| 2006/0131052 A1 | 6/2006 | Mhetar et al. |
| 2006/0191706 A1 | 8/2006 | Mhetar et al. |
| 2008/0000670 A1* | 1/2008 | Pluister .................. 174/113 R |

OTHER PUBLICATIONS

GE Advanced Materials Plastics, NORYL Resin WCV072, Jul. 11, 2005, 3 pages.

GE Plastics, NORYL WCV072L-111, Mar. 3, 2006, 7 pages, Pittsfield, MA (U.S.A.) & Mississauga, ONT (Canada).

U.S. Appl. No. 11/473,648, filed Jun. 23, 2006, Chiruvella; Raman V., et al.

"GE Helps Delphi Lose Weight in Automotive Wire Coating and Meet Halogen-Free Part Requirements with Flexible Noryl Resin", article dated May 10, 2005, 3 pages.

Ryan Gehm, "GE Resin Enables Lighter, Smaller Cables", article dated Jul. 2005, 2 pages.

"Flexible PPE Alloy Debuts in Auto Wire Coating", article dated Jul. 2005, 1 page.

"Delphi's Halogen-Free Automotive Cable Making European Debut at Frankfurt Show", press release dated Sep. 13, 2005, 2 pages.

Delphi Packard Marks First of Many "PPO" Milestones to Come. Jan. 5, 2005, 2 pages.

Delphi Supports Launch of GE's "Ecomagination" Initiative. May 12, 2005, 2 pages.

Delphi Packard Bringing Innovative PPO Cable to European Market. Jun. 28, 2005, 2 pages.

Division's Newly Named PPE Cable Receives "Green Light" from First Scheduled Customer. .Oct. 4, 2005, 2 pages.

Delphi Packard's Innovative Halogen-Free Cable Highlighted at Joint Media Roundtable with GE. Oct. 4, 2005, 1 page.

"Moving Forward" with Toyota Continues with Another Win. Jan. 18, 2006, 2 pages.

Delphi Packard, General Electric Begin Pondering "What's Next?" Mar. 10, 2006, 2 pages.

Global Engineering: Delphi Halogen-Free Cable Team. May 31, 2006, 2 pages.

Materials: GE and Delphi to Announce Breakthrough. Automotive NewsWire. May 2, 2005, 4 pages.

Coating Offers Auto Makers Less Weight, Environmental Compliance, No Halogen Content. Wire & Cable Technology International. Jul. 2005, 1 page.

Rhoda Miel, GE, Delphi Team Up On Alternative Coating. Plastics News Staff. May 16, 2005, 1 page.

* cited by examiner

NON-HALOGENATED HEAVY METAL FREE VEHICULAR CABLE INSULATION AND HARNESS COVERING MATERIAL

This application is a continuation-in-part of U.S. patent application Ser. No. 11/473,648 filed on Jun. 23, 2006 now U.S. Pat. No 7,408,116.

TECHNICAL FIELD

The present invention is concerned with a vehicular cable insulation and harness covering material that is non-halogenated and heavy metal free. In particular, the invention pertains to an automotive wire harness insulation and a harness covering material of a non-halogenated composition.

BACKGROUND OF THE INVENTION

Environmental regulations dictate that the material selection in the vehicular industry needs to be halogen free and heavy metal free compositions especially for the vehicular materials. Typically, polyvinyl chloride (PVC) is utilized because of its combination of competitive raw materials costs and desirable properties. These properties include processibility, toughness, chemical resistance and ability to withstand temperatures typical for many applications in automotive environments.

Unfortunately, the chlorine content of PVC limits its disposal at the end of the life of the vehicle. Also there are concerns about effects on health and the environment by PVC by-products and PVC plasticizer. Accordingly, therefore, a replacement for PVC has long been sought with an intent to find competitive cost efficient replacements. In addition, performance must be taken into account including high temperature endurance, toughness, processability and also reduction in weight.

Polyethylene terephthalate (PET) can also be considered a halogen free material for tape. However, PET based tapes are limited to uses where high performance is needed because of cost and price. Typically, this would be for performance needs such as high temperature, endurance sound deadening or toughness.

It is therefore desirable to have a harness covering material that is cost effective and still achieves desirable characteristics such as lack of halogens and heavy metals, appropriate temperature resistance, scrape abrasion resistance, resistance to heat aging, resistance to automotive fluids and resistance to flame and in particular to be capable of meeting the standard SAE (Society of automotive Engineers) J2192 or LV312 and offers all these properties with a reduction in weight.

SUMMARY OF THE INVENTION

Described is an insulated non-halogenated, heavy metal free vehicular cable comprising an inner core of a copper based metal wire having a thickness area of at least about 0.1 mm, and an outer insulation, covering the length of the inner core, comprised of a thermoplastic polyphenylene ether composition that has no halogen or heavy metal added thereto, the insulated cable capable of meeting the testing standard ISO 6722.

Also described is a tape comprised of a layer, having a top and bottom thereto, of a thermoplastic polyphenylene ether composition that has no halogen or heavy metal added thereto; a contact adhesive adhering to one side of the thermoplastic polyphenylene ether composition and optionally a pealable layer or release liner adhered to the contact adhesive, which pealable layer is capable of being pealed off the tape, thereby permitting the thermoplastic polyphenylene ether composition to be applied to a desired surface.

BRIEF DESCRIPTION OF THE DRAWINGS

Further objects and advantages of the invention will be apparent from the following description and appended claims, reference being made to the accompanying drawings forming a part of the specification, wherein like reference characters designate corresponding parts in several views.

DETAILED DESCRIPTION OF THE INVENTION

With increasing electronic content in automobiles there is an ever growing need for miniaturizing the size of the cables that provide resistance to physical abuse and provide resistance to flame and automotive fluids among other requirements to be met for the automotive industry such as ISO 6722. It has been found to be particularly desirable to utilize an insulated non-halogenated, heavy metal free vehicular cable containing a copper based metal wire that has a diameter of at least about 0.1 mm or more and an outer insulation covering the length of the inner core comprised of a thermoplastic polyphenylene ether composition which has no halogen or heavy metal added thereto.

Definitions:

By "non-halogenated" is meant that the polymeric material that is utilized has no halogen material that is added to the composition, as a desirable component of the composition.

By "heavy metal free" is meant that no heavy metal such as mercury, hexavalent chrome, cadmium, lead and the like are added to the metal core, as a desirable component of the metal composition.

By "copper based metal" is meant that the metal wire is comprised of greater than 50% by weight of the metal being copper, or copper alloyed with other metal components as is well known in the industry yet maintaining suitable electrical conductivity. Well known copper based alloys may be used such as HPC-80EF, trademark Phelps Dodge.

By "polyphenylene ether" is meant a thermoplastic polymeric material which is commercially available and generally are polymers of monohydroxy aromatic materials. Other readily available materials are 2,6-xylenol or a 2,3,6-trimethylphenyl and polymers thereof. Polyphenylene ether (PPE) is also known as polyphenylene oxide (PPO) and is described in the literature. See U.S. Pat. Nos. 3,306,874, 3,306,875; 3,257,357; and 3,257,358, which are herein incorporated by reference.

Frequently polyphenylene ether materials are a blend of other thermoplastic or cross-linked ethylenically unsaturated materials such as polyolefinic materials, styrene or styrene butadiene or polyacryamide and the like. These materials are commercially available such as Noryl, Luranyl, Ultranyl or Vestoblend, trademarks of GE. Some materials that may be utilized include Noryl WCV072, WCV072L-111, and the like of GE.

It has been found that the ultra thin cable and cable wall that is utilized in the present case even at a small cross section of 0.1 $mm^2$ give a very satisfactory result in abrasion cycling tests such as that called for in ISO-6722.

The cross sectional area of the copper wire can range from about 0.1 to about 3 square millimeters, such as 26 AWG to 12 AWG, alternatively 0.13 to 1.5 square millimeters.

Figure 3:
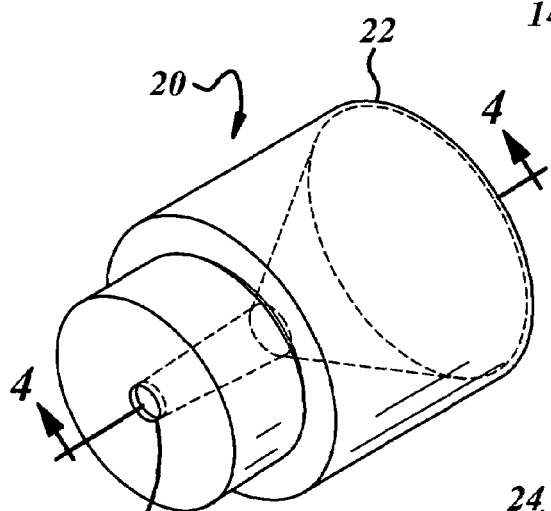
FIG. 3 is a die used to manufacture an embodiment of the insulated vehicular cable of the present invention.
Figure 4:
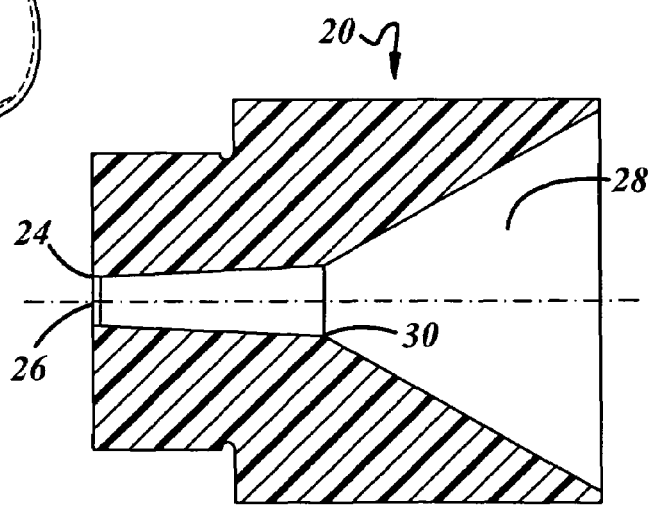
FIG. 4 is a cross-section of FIG. 3 taken along lines 4-4.

The insulated cable of the present invention is prepared utilizing normal well known commercially available equipment where the desired polyphenylene ether polymer is fed to an extrusion machine where the molten viscous polymer is passed through a die, as shown in FIGS. 3-4, so that the insulating PPE is wrapped around the linear portion of the metal conductor wire. The processing temperatures that may be utilized can vary as is well known in the industry. However, it has been found desirable to heat the resin material obtained from the supplier as follows. The thermoplastic polyphenylene ether material is dried at about 180° F. for at least 2 hours and is then passed through the first stage of an extrusion machine. The feed temperature is approximately 115° F. The compression temperature and the metering temperature in the barrels of the extruder can vary. A compression temperature may be from about 475° F. to 490° F. The metering temperature is approximately 500° F. to 540° F. The cross head or the die temperature is approximately 540° F. to 560° F. After the wire is extruded with the insulated material thereon, it passes through a cooling water bath and mist which is maintained at room temperature and then is packed as a cable in a barrel for subsequent handling.

Figure 1:
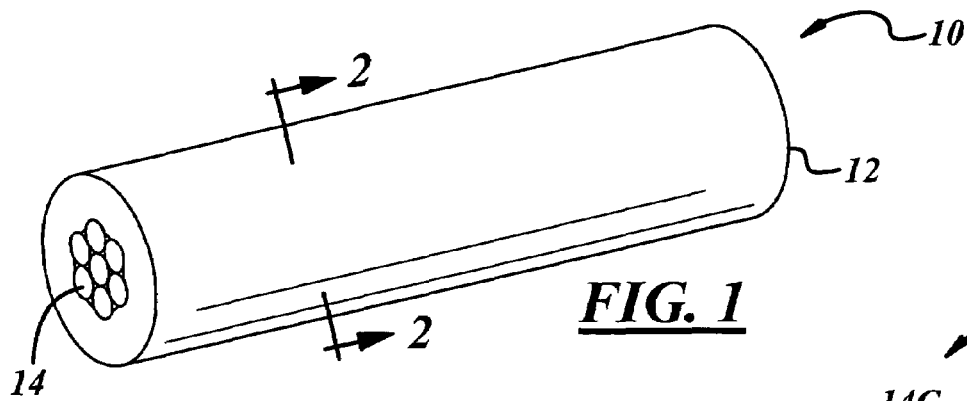
FIG. 1 is a perspective view of the vehicular cable of the present invention.
Figure 2:
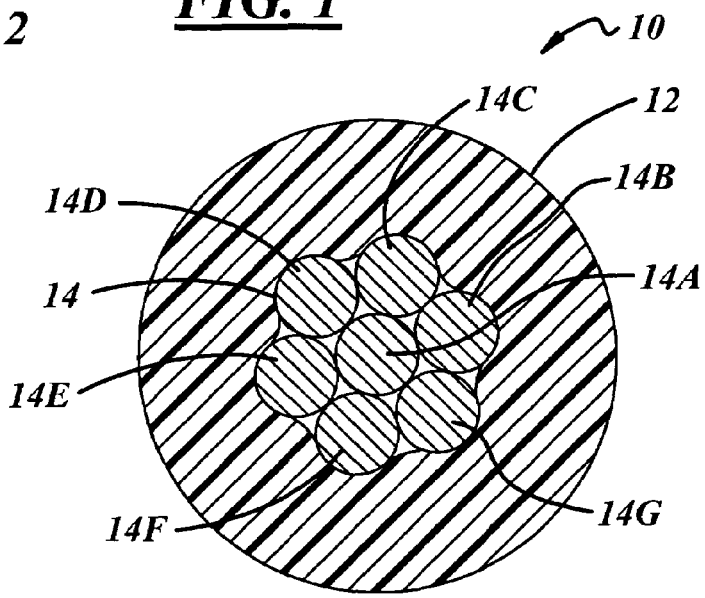
FIG. 2 is a cross-section of FIG. 1 taken along lines 2-2.

Turning now to a description of the drawings. FIG. 1 is the insulated vehicular cable 10 of the present invention having an insulated member 12 of PPE extruded or wrapped around the copper base metal core 14. An embodiment is shown in FIGS. 1 and 2 wherein the inner copper core is comprised of several wires 14 A-G with a central wire 14 A. The central wire 14A is surrounded by the other wires 14 B-G. There can be 7, 19 or 37 strands in metal core 14, in some instances they are compressed and in the other they are bunched.

During the extrusion process of the insulated vehicular cable 10, the copper based core is fed through the middle of die 20 entering the back end 22 of the die and exiting from the die at 24. The die has a central portion 26 through which the copper based wire 14 passes. The hot viscous PPE will be passed into the space 28 at the entrance end 22 of the die 20 and proceeds to envelop the copper wire. The die begins to narrow at 30 as PPE is extruded with the copper based wire passing from 30 through exit 24 of the die. At the exit 24 of the die, the insulated vehicular cable 10 of the present invention is obtained. The cooling process as described above and the packaging of the cable follows thereafter.

The diameter of the insulated vehicular cable 10 of the present invention can vary substantially. A cable diameter that has been found useful is between 0.85 and 0.92 mm in case of 0.13 mm$^2$ cable. Other dimensions of an insulated vehicular cable would be one that has approximately 0.13 square millimeters of wire as its cross sectional area but which is used to form the embodiment shown in FIG. 1 namely a central wire with six surrounding wires. In that case, the conductor diameter may be approximately 0.465 millimeters with a cable diameter 10 of approximately 0.88 millimeters with the minimum insulated wall thickness of 0.198 millimeters.

As indicated above a wide variety of commercially available extruding equipment may be utilized such as an extruder identified as BMD60-24D or a Nokia Maillefer, and the like.

The die utilized in the present invention may be manufactured from a wide variety of commercially available materials such as D2 hardened tool steel.

Following the procedures outlined in ISO-6722, scrape abrasion resistance using 7(N) load and 0.45 millimeter needle was used on three sets of cables, the first being compressed halogen free cable ISO ultra thin wall cable referred as CHFUS, the second ISO thin wall cable referred as HFSS and the third ISO thick wall cable referred as HF. The test results are identified in tables 1 and 2 below.

Following the procedures outlined in ISO-6722 a number of tests were so performed where the thickness of the copper wire varied as well as the diameter of insulated polyphyenelyene ether varied as is shown in tables 3-4.

TABLE 1

| | CHFUS | | | | | | |
|---|---|---|---|---|---|---|---|
| | 0.13* | 0.22* | 0.35* | 0.50* | 0.75* | 1.00* | 1.25* |
| Normal Force(N) | 4.0 | 4.0 | 5.0 | 5.0 | 6.0 | 6.0 | 6.0 |
| Minimum cycles required at the normal force | 100 | 100 | 100 | 150 | 150 | 180 | 180 |
| Result 7N Load | 166 | 550 | 338 | 376 | 536 | 526 | 1315 |
| | 151 | 338 | 244 | 1150 | 836 | 960 | 2181 |
| | 125 | 379 | 223 | 458 | 1078 | 1171 | 610 |
| | 174 | 397 | 287 | 560 | 722 | 984 | 2673 |
| Minimum cycles attained by the cable at 7 Newton load | 125 | 338 | 223 | 376 | 536 | 526 | 610 |
| Pass/Fail | ○ | ○ | ○ | ○ | ○ | ○ | ○ |

*Wire Size (square mm)

TABLE 2

| | HFSS | | | | | | HF |
|---|---|---|---|---|---|---|---|
| | 0.35* | 0.50* | 0.75* | 1.00* | 1.25* | 2.00* | 3.00* |
| Normal Force(N) | 5.0 | 5.0 | 6.0 | 6.0 | 6.0 | 7.0 | 7.0 |
| Minimum cycles required at the normal force | 100 | 150 | 150 | 180 | 180 | 750 | 750 |
| Result 7N Load | 443 | 4067 | 7193 | 6043 | 10434 | 12586 | *>5000 |
| | 2396 | 893 | 9636 | 3896 | 5158 | 10835 | |
| | 830 | 4271 | 4512 | 7771 | 3559 | 11203 | |
| | 1031 | 2586 | 6198 | 8776 | 16333 | 12308 | |
| Minimum cycles attained by the cable at 7 Newton load | 443 | 893 | 4512 | 3896 | 3559 | 10835 | *>5000 |
| Pass/Fail | ○ | ○ | ○ | ○ | ○ | ○ | ○ |

*Wire Size (square mm)

Following the procedures outlined in ISO-6722 a number of tests were so performed where the cross sectional area of the copper wire varied as well as the diameter of insulated polyphyenelyene ether varied as is shown in tables 3-4.

TABLE 3

| Test | Item | | | Unit | Wire Thickness Area (square mm) | Cable Type and Size | | | | | | | | |
|---|---|---|---|---|---|---|---|---|---|---|---|---|---|---|
| | | | | | | | | | | CHFUS Size | | | | |
| | | | | | | 0.13 | 0.22 | 0.35 | 0.50 | 0.75 | 1.00 | 1.25 | 1.50 | |
| ISO6722 | Certifi-cation | Dimensions | Thickness of Ins. (min) | (mm) | | 0.179 | 0.274 | 0.190 | 0.211 | 0.194 | 0.196 | 0.210 | 0.223 | |
| | | | Cable Outer Dia. | (mm) | | 0.872 | 1.027 | 1.127 | 1.279 | 1.391 | 1.590 | 1.794 | 1.849 | |
| | | Electrical | Resistance | (mΩ/m) | See 6.1 Must be smaller than requirement (Measured result) See Table 4 | 157.100 | 78.600 | 49.600 | 34.600 | 24.300 | 17.200 | 14.100 | 12.000 | |
| | | | Ins. Resistance in water | (mΩ/m) | Requirement | 169.900 | 84.400 | 54.400 | 37.100 | 24.700 | 18.500 | 14.900 | 12.700 | |
| | | | Spark test | | Sec. 6.2 Breakdown shall not occur | Pass | Pass | Pass | Pass | Pass | Pass | Pass | Pass | |
| | | | | | Sec. 6.3 No breakdown shall occur when the earthed cable is drawn through the test electrode | Pass | Pass | Pass | Pass | Pass | Pass | Pass | Pass | |
| | | Mechanical | Pressure test at high temp. | | Sec. 7.1 Breakdown shall not occur during the withstand voltage test | Pass | Pass | Pass | Pass | Pass | Pass | Pass | Pass | |
| | | Low-temp | Winding under low temp | | Sec. 8.1 After winding, no conductor shall be visible. During the withstand voltage test, breakdown shall not occur. | Pass | Pass | Pass | Pass | Pass | Pass | Pass | Pass | |
| | | Abrasion | Scrape | (N) (times) (times) | Sec. 9.3 Load requirement Scrape requirement Min. scrape result | 4 100 1309 | 4 100 3052 | 5 100 951 | 5 150 1636 | 6 150 441 | 6 180 844 | 6 180 883 | 6 200 1058 | |
| | | Heat aging | Short high temp | | Sec. 10.1 After winding, no conductor shall be visible. During the withstand voltage test, breakdown shall not occur. | Pass | Pass | Pass | Pass | Pass | Pass | Pass | Pass | |
| | | | Long high temp 85 deg C. | | Sec. 10.2 After winding, no conductor shall be visible. During the withstand voltage test, breakdown shall not occur. | Pass | Pass | Pass | Pass | Pass | Pass | Pass | Pass | |
| | | | Shrinkage by high temp | (mm) | Sec. 10.4 The maximum shrinkage shall not exceed 2 mm at either end | Pass | Pass | Pass | Pass | Pass | Pass | Pass | Pass | |
| | | Resistance to chemical | Gasoline | (%) | Sec. 11.1 The maximum outside cable diameter change shall meet the requirement shown in Table 13. After winding, no conductor shall be visible. During the withstand voltage test, breakdown shall not occur. | Pass 5.15 | Pass 5.40 | Pass 0.09 | Pass 2.83 | Pass −6.39 | Pass 0.06 | Pass 0.00 | Pass 0.32 | |
| | | | Diesel | (%) | | Pass 4.56 | Pass 4.72 | Pass 8.63 | Pass −0.58 | Pass −0.40 | pass 6.20 | Pass 3.55 | Pass 1.88 | |
| | | | Engine Oil | (%) | | Pass 5.75 | Pass 2.44 | Pass 2.70 | Pass −6.91 | Pass −5.66 | Pass −4.84 | Pass 0.83 | Pass 0.70 | |
| | | Flame | Flamability at 45 degree angle | (Sec) | Sec. 12 Any combustion flame of insulating material shall extinguish within 70 s, and a minimum of 50 mm of insulation at the top of the test sample shall remain unburned | 0.0 | 0.0 | 0.0 | 0.0 | 0.0 | 0.0 | 4.0 | 4.0 | |
| If required | | Electrical | Insulation volume resistivity | Ohm mm | Sec. 6.4 Greater than 10⁹ Ohm mm | Pass 1.6E+15 | Pass 1.0E+16 | Pass 1.70E+16 | Pass 2.50E+21 | Pass 8.60E+17 | Pass 3.50E+21 | Pass 7.30E+17 | Pass 9.10E+19 | |
| | | Mechanical | Strip force | (N) | Sec. 7.2 Greater than specified by customer Requirement (Min) | 28.8 Pass 2 Not required | 31.6 Pass 2 Not required | 41 Pass 5 Not required | 69.7 Pass 5 Not required | 52.5 Pass 5 Not required | 75.7 Pass 5 Not required | 70.1 Pass 5 Not required | 63.8 Pass 5 Not required | |
| | | Low-temp | Impact | | Sec. 8.2 After impact, no conductor shall be visible. During the withstand voltage test, breakdown | | | | | | | | | |

TABLE 3-continued

| Test | Item | | Unit | Wire Thickness Area (square mm) | Cable Type and Size | | | | | | | | |
|---|---|---|---|---|---|---|---|---|---|---|---|---|---|
| | | | | | | | | | CHFUS Size | | | | |
| | | | | | 0.13 | 0.22 | 0.35 | 0.50 | 0.75 | 1.00 | 1.25 | 1.50 | |
| | Heat aging | Thermal overload | | shall not occur. Sec. 10.3 After winding, no conductor shall be visible. During the withstand voltage, breakdown shall not occur | Pass | Pass | Pass | Pass | Pass | Pass | Pass | Pass | |
| | Resistance to chemical | Ethanol | (%) | Sec. 11.1 The maximum outside cable diameter change shall meet the requirement shown in Table 13. After winding, no conductor shall be visible. During the withstand voltage test, breakdown shall not occur. | Pass 4.01 | Pass 4.42 | Pass 2.70 | Pass −6.98 | Pass −6.06 | Pass −5.26 | Pass 1.33 | Pass 1.61 | |
| | | Power steering fluid | (%) | | Pass 4.00 | Pass 6.39 | Pass 3.68 | Pass 5.76 | Pass −4.73 | Pass −3.48 | Pass 1.33 | Pass 3.71 | |
| | | Automatic transmission fluid | (%) | | Pass 4.07 | Pass 5.52 | Pass 4.31 | Pass 6.05 | Pass −2.46 | Pass −3.96 | Pass 2.11 | Pass 1.51 | |
| | | Engine coolant | (%) | | Pass 3.09 | Pass 0.29 | Pass 0.99 | Pass 1.65 | Pass −0.20 | Pass 0.06 | Pass 0.44 | Pass −0.32 | |
| | | Battery | (%) | | Pass −0.11 | Pass 1.48 | Pass 1.08 | Pass 2.12 | Pass −1.00 | Pass 0.24 | Pass 0.00 | Pass −0.32 | |
| | | Ozone | | Sec. 11.3 The visual examination of the insulation shall not reveal any crac | | | | Pass | | | | | |
| | | Hot water | (Ω · mm) | Sec. 11.4 The insulation volume resistivity shall not be less than 10⁹ Ohm mm. A visual examination of the insulation | | | | Pass | | | | | |
| | | Temp. and humidity cycling | | Sec. 11.5 After winding, no conductor shall be visible. During the withstand voltage test, breakdown shall not occur | Pass | Pass | Pass | Pass | Pass | Pass | Pass | Pass | |

TABLE 4

| Test | | Item | | Unit | Wire Thickness Area (square mm) | Cable Type and Size | | | | | | | |
|---|---|---|---|---|---|---|---|---|---|---|---|---|---|
| | | | | | | 0.35 | 0.50 | HFSS Size 0.75 | 1.00 | 1.25 | 2.00 | PPO HF Size 3.00 | |
| ISO6722 | Certification | Dimensions | Thickness of Ins. (min) | (mm) | | 0.258 | 0.231 | 0.252 | 0.322 | 0.320 | 0.348 | 0.653 | |
| | | | Cable Outer Dia. | (mm) | | 1.289 | 1.481 | 1.773 | 1.943 | 2.088 | 2.551 | 3.598 | |
| | | Electrical | Resistance | (mΩ/m) | Sec 6.1 Must be smaller than requirement (Measured result) See Table 4 | 46.200 | 33.100 | 23.200 | 16.800 | 13.900 | 8.840 | 5.76 | |
| | | | | (mΩ/m) | Requirement | 54.400 | 37.100 | 24.700 | 18.500 | 14.900 | 9.420 | 6.150 | |
| | | | | | Sec. 6.2 Breakdown shall not occur | Pass | Pass | Pass | Pass | Pass | Pass | Pass | |
| | | | Ins. Resistance in water | | Sec. 6.3 No breakdown shall occur when the earthed cable is drawn through the test electrode | Pass | Pass | Pass | Pass | Pass | Pass | Pass | |
| | | | Spark test | | Sec. 7.1 Breakdown shall not occur during the withstand voltage test | Pass | Pass | Pass | Pass | Pass | Pass | Pass | |
| | | Mechanical | Pressure test at high temp. | | Sec. 8.1 After winding, no conductor shall be visible. During the withstand voltage test, breakdown shall not occur. | | | | | | | | |
| | | Low-temp | Winding under low test. | | | | | | | | | | |
| | | Abrasion | Scrape | (N) | Sec. 9.3 Load requirement | 5 | 5 | 6 | 6 | 6 | 7 | 7 | |
| | | | | (times) | Scrape requirement | 100 | 150 | 150 | 180 | 180 | 750 | 750 | |
| | | | | (times) | Min. scrape result | 1688 | 2141 | >5000 | >5000 | >5000 | 10835 | >5000 | |
| | | Heat aging | Short high temp | | Sec. 10.1 After winding, no conductor shall be visible. During the withstand voltage test, breakdown shall not occur. | Pass | Pass | Pass | Pass | Pass | Pass | Pass | |
| | | | Long high temp 85 deg C. | | Sec. 10.2 After winding, no conductor shall be visible. During the withstand voltage test, breakdown shall not occur. | Pass | Pass | Pass | Pass | Pass | Pass | Pass | |
| | | | Shrinkage by high temp | (mm) | Sec. 10.4 The maximum shrinkage shall not exceed 2 mm at either end | Pass | Pass | Pass | Pass | Pass | Pass | Pass | |
| | | Resistance to chemical | Gasoline | (%) | Sec. 11.1 The maximum outside cable diameter change shall meet the requirement shown in Table 13. After winding, no conductor shall be visible. During the withstand voltage test, breakdown shall not occur. | Pass | Pass | Pass | Pass | Pass | Pass | Pass | |
| | | | | | | −4.79 | −4.54 | −3.57 | 2.07 | 2.23 | 6.77 | 13.4 | |
| | | | Diesel | (%) | | Pass | Pass | Pass | Pass | Pass | Pass | Pass | |
| | | | | | | −3.50 | −2.71 | −1.65 | 3.16 | −2.00 | 2.20 | 1.63 | |
| | | | Engine Oil | (%) | | Pass | Pass | Pass | Pass | Pass | Pass | Pass | |
| | | | | | | −6.36 | −5.74 | 1.17 | 2.19 | −3.91 | 0.94 | 0.14 | |
| | | Flame | Flamability at 45 degree angle | (Sec) | Sec. 12 Any combustion flame of insulating material shall extinguish within 70 s, and a minimum of 50 mm of insulation at the top of the test sample shall remain unburned | 0.0 | 0.0 | 4.0 | 5.0 | 4.0 | 8.0 | 14 | |
| If required | | Electrical | Insulation volume resistivity | Ohm mm | Sec. 6.4 Greater than 10⁹ Ohm mm. | Pass 2.90E+21 | Pass 7.70E+17 | Pass 8.30E+16 | Pass 2.80E+16 | Pass 3.20E+16 | Pass 9.70E+16 | Pass 3.40E+21 | |
| | | Mechanical | Strip force | (N) | Sec. 7.2 Greater than specified by customer Requirement (Min) | 63 Pass 5 | 115.3 5 | 69.4 Pass 5 | 88.0 Pass 5 | 112 Pass 5 | 113.3 Pass 10 | 230 15 | |
| | | Low-temp | Impact | | Sec. 8.2 After impact, no conductor shall be visible. During the withstand voltage test, breakdown shall not occur. | Not required | Not required | Pass | Pass | Pass | Pass | Pass | |

TABLE 4-continued

| Test | Item | | Unit | Wire Thickness Area (square mm) | Cable Type and Size | | | | | | PPO HF Size |
|---|---|---|---|---|---|---|---|---|---|---|---|
| | | | | | HFSS Size | | | | | | |
| | | | | 0.35 | 0.50 | 0.75 | 1.00 | 1.25 | 2.00 | 3.00 |
| Heat aging | Thermal overload | | | Sec. 10.3 After winding, no conductor shall be visible. During the withstand voltage, breakdown shall not occur | Pass | Pass | Pass | Pass | Pass | Pass | Pass |
| Resistance to chemical | Ethanol | | (%) | Sec. 11.1 The maximum outside cable diameter change shall meet the requirement shown in Table 13. After winding, no conductor shall be visible. During the withstand voltage test, breakdown shall not occur. | 5.93 | -5.36 | 1.17 | 5.97 | -3.82 | 1.45 | 1.3 |
| | Power steering fluid | | (%) | | Pass | Pass | Pass | Pass | Pass | Pass | Pass |
| | | | | | -5.36 | -3.72 | -3.52 | 6.99 | -2.64 | 2.08 | 0.36 |
| | Automatic transmission fluid | | (%) | | Pass | Pass | Pass | Pass | Pass | Pass | Pass |
| | | | | | -5.65 | -4.61 | -3.09 | 6.99 | -2.55 | 1.92 | 0.58 |
| | Engine coolant | | (%) | | Pass | Pass | Pass | Pass | Pass | Pass | Pass |
| | | | | | -7.22 | 0.13 | -5.54 | -1.17 | 0.00 | 0.74 | 0.64 |
| | Battery | | (%) | | Pass | Pass | Pass | Pass | Pass | Pass | Pass |
| | | | | | 0.78 | -0.19 | -0.32 | 5.00 | 0.38 | -0.04 | 0 |
| | Ozone | | | Sec. 11.3 The visual examination of the insulation shall not reveal any cracks | | | | Pass | | | |
| | Hot water | | (Ω · mm) | Sec. 11.4 The insulation volume resistivity shall not be less than 10⁹ Ohm mm. A visual examination of the insulation | | | | Pass | | | |
| | Temp. and humidity cycling | | | Sec. 11.5 After winding, no conductor shall be visible. During the withstand voltage test, breakdown shall not occur | Pass | Pass | Pass | Pass | Pass | Pass | Pass |

Listed below in Table 5 is a measurement of the PPE toughness for ISO 6722 needle abrasion cycles to failure compared to material thickness using a 7-N load and 0.45 millimeter needle.

TABLE 5

| Insulation Material | 0.4-mm cable insulation thickness | 0.25-mm cable insulation thickness | 0.16-mm cable insulation thickness |
|---|---|---|---|
| PPE | 10000 | 200 | 110 |

Current PVC tape construction has thicknesses for backings of 0.09-mm and above. This thickness for PVC is required to provide a minimum amount of toughness or abrasion protection while also providing sufficient tensile and tear strength that PVC tape may be applied. Given data from Table 5 and the current film thickness, one can conclude that significantly thinner backings are possible with PPE. PPE backings as thin as 0.03-mm or less could be achieved and still maintain equivalent abrasion protection and toughness to the current PVC backings. Given this potential for reducing backing thickness and specific gravity differences, a weight reduction of 75% seems reasonable with a PPE tape compared to a PVC tape.

With thinner backings, greater linear length of tape can be put up on each roll of tape. This is important for handling in and application of tapes on substrates or wire harnesses. The physical dimensions of a tape roll are limited to physical constraints with a manufacturing operation and by human ergonomic issues. Too large of roll diameters are ergonomically awkward and uncomfortable for continuous daily use. However with thinner tapes, longer roll lengths are possible while still maintaining an acceptable roll diameter. This then benefits the manufacturing by minimizing the number of times workers must retrieve new rolls. For an automotive wire harness manufacturing, a new roll may be required as often as once or twice per wire harness. Also benefit is achieved in shipping since more tape can be shipped for a given container volume.

In addition to being halogen free and tougher than PVC, PPE also offers ability to be used in higher temperature environments. Currently PVC may be rated for use at 105° C. which limits it to select exterior automotive applications. Many of the applications however, such as engine and chassis require temperature ratings of 125° C. and above. This is feasible with PPE which has been rated to 125° C. for continuous use and with excursions to 150° C. and above.

PPE backings could be used with any desired pressure sensitive adhesive available today. This would include natural rubber, natural rubber/synthetic rubber blends, synthetic rubber, acrylic, or other adhesive systems.

Figure 5:
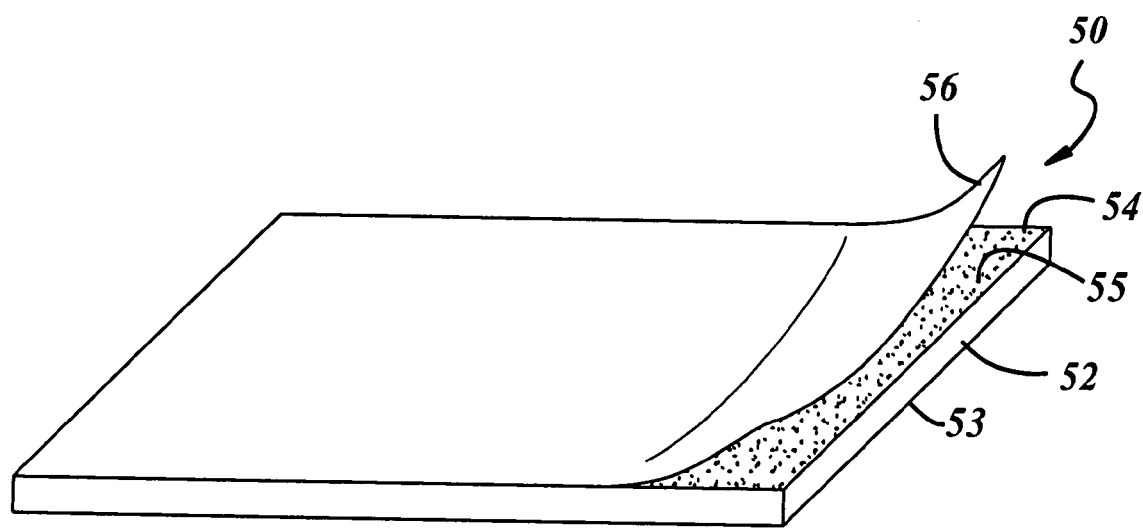
FIG. 5 is a tape of the present invention.
Figure 6:
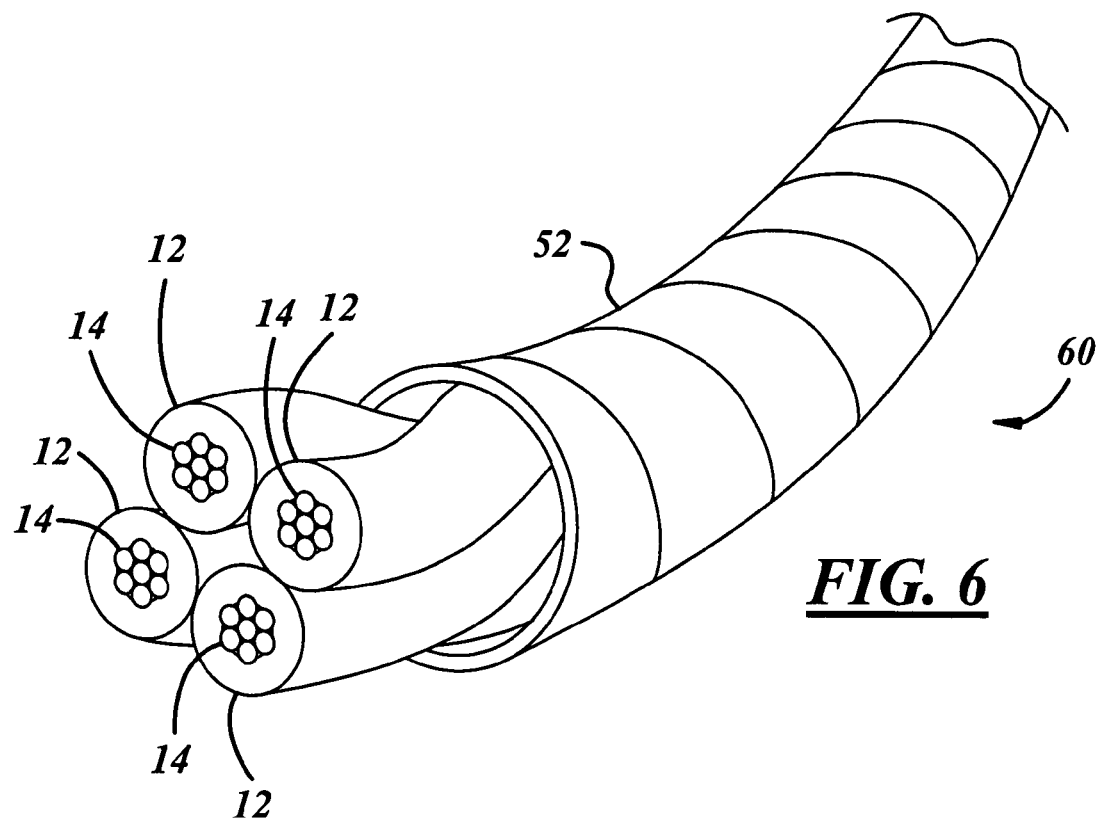
FIG. 6 is the tape of the present invention wrapped around a plurality of vehicular cables of FIG. 1.

Turning now to FIG. 5 it is a schematic representation of the tape 50 of the present invention with the PPE material 52 having top 53 and bottom 55 surfaces where an adhesive 54 would be attached to the bottom surface. The adhesive is generally a pressure sensitive adhesive which would facilitate the adhesion of the PPE tape to a desirable substrate. The tape would frequently be made available with a pealable backing 56.

There are a wide variety of pressure sensitive adhesives well known in the trade for applying such adhesives to thermal plastic materials. Such adhesives can be natural rubber, synthetic rubber, cross-link acrylics or blends of these polymers. Formulated adhesives may be include Morscic, Acronyl or Duro-Tak that are particular types of acrylic adhesive to be used to coat the bottom portion of the PPE material. The pealable tape can be a variety of materials such as paper, cellulose or any plastic film materials that can be coated with a release layer such as a silicone coating well known in the art.

We claim

1. A vehicular harness comprising:
a plurality of insulated non-halogenated, heavy metal free vehicular cables, each comprising:
an inner core of a copper based metal wire having a thickness area of 0.1 mm$^2$ to 0.13 mm$^2$, and
an outer insulation, covering the length of the inner core, comprised of a thermoplastic polyphenylene ether composition that has no halogen or heavy metal added thereto, the inner core of a copper based metal wire with the outer insulation capable of meeting the testing standard ISO 6722; and
a tape comprising a layer, wherein the layer has a top surface and a bottom surface and the top surface is generally parallel to the bottom surface, and a thickness between the top surface and bottom surface of less than about 0.09 mm, of the thermoplastic polyphenylene ether composition that has no halogen or heavy metal added thereto, and a contact adhesive adhering to the bottom surface, wrapped around the plurality of cables to hold the cables together, and wherein at least a portion of the top surface is exposed to ambient air when the tape is wrapped around the plurality of cables.

2. A vehicular harness comprising:
a plurality of insulated non-halogenated, heavy metal free vehicular cables, each comprising:
an inner core of a copper based metal wire having a thickness area of 0.13 mm$^2$, and
an outer insulation, covering the length of the inner core, comprised of a thermoplastic polyphenylene ether composition that has no halogen or heavy metal added thereto, the inner core of a copper based metal wire with the outer insulation capable of meeting the testing standard ISO 6722; and
a tape comprising a layer, wherein the layer has a top surface and a bottom surface and the top surface is generally parallel to the bottom surface, and a thickness between the top surface and bottom surface of less than about 0.09 mm, of the thermoplastic polyphenylene ether composition that has no halogen or heavy metal added thereto, and a contact adhesive adhering to the bottom surface, wrapped around the plurality of cables to hold the cables together, and wherein at least a portion of the top surface is exposed to ambient air when the tape is wrapped around the plurality of cables.

3. A vehicular harness comprising:
a plurality of insulated non-halogenated, heavy metal free vehicular cables, each comprising:
an inner core of a copper based metal wire having a thickness area of at least about 0.1 sq. mm, and
an outer insulation, covering the length of the inner core, comprised of a thermoplastic polyphenylene ether composition that has no halogen or heavy metal added thereto, the inner core of a copper based metal wire with the outer insulation capable of meeting the testing standard ISO 6722;
a tape comprising a layer, wherein the layer has a top surface and a bottom surface and the top surface is generally parallel to the bottom surface, and a thickness between the top surface and bottom surface of less than about 0.09 mm, of the thermoplastic polyphenylene ether composition that has no halogen or heavy metal added thereto, and a contact adhesive adhering to the bottom surface, wrapped around the plurality of cables to hold the cables together, and wherein at least a portion of the top surface is exposed to ambient air when the tape is wrapped around the plurality of cables; and wherein the plurality of insulated non-halogenated, heavy metal free vehicular cables are constructed and arranged to withstand flame at a 45 degree angle such that any combustion flame of the outer insulation extinguishes within 70 seconds and a minimum of 50 mm of insulation at the top of the insulated cable remains unburned, and to have a scrape abrasion resistance of greater than 100 cycles using a 7N load and a 0.45 millimeter needle.

* * * * *